(12) United States Patent
Dariush

(10) Patent No.: US 8,082,062 B2
(45) Date of Patent: Dec. 20, 2011

(54) REGENERATIVE ACTUATION IN MOTION CONTROL

(75) Inventor: Behzad Dariush, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1214 days.

(21) Appl. No.: 11/450,248

(22) Filed: Jun. 8, 2006

(65) Prior Publication Data

US 2006/0293791 A1    Dec. 28, 2006

Related U.S. Application Data

(60) Provisional application No. 60/689,502, filed on Jun. 10, 2005.

(51) Int. Cl.
*G06F 19/00* (2006.01)
*G05B 19/00* (2006.01)
*G05B 15/00* (2006.01)

(52) U.S. Cl. .......... 700/245; 700/260; 700/261

(58) Field of Classification Search ...... 700/1, 245–264; 702/142, 150; 703/2, 11; 318/87–89, 376–378
See application file for complete search history.

(56) References Cited

U.S. PATENT DOCUMENTS

| | | | |
|---|---|---|---|
| 4,244,120 A | 1/1981 | Harris | |
| 4,786,847 A | 11/1988 | Daggett et al. | |
| 4,834,200 A | 5/1989 | Kajita | |
| 4,925,312 A | 5/1990 | Onaga et al. | |
| 5,038,089 A * | 8/1991 | Szakaly ............ | 701/23 |
| 5,044,360 A | 9/1991 | Janke | |
| 5,136,227 A | 8/1992 | Nakano et al. | |
| 5,203,346 A | 4/1993 | Fuhr et al. | |
| 5,247,432 A | 9/1993 | Ueda | |
| 5,323,549 A | 6/1994 | Segel et al. | |
| 5,362,288 A | 11/1994 | Razon | |
| 5,432,417 A | 7/1995 | Takenaka et al. | |
| 5,459,659 A | 10/1995 | Takenaka | |
| 5,476,441 A | 12/1995 | Durfee et al. | |
| 5,550,444 A * | 8/1996 | Zeller ............ | 318/139 |
| 5,570,286 A | 10/1996 | Margolis et al. | |
| 5,625,577 A | 4/1997 | Kunii et al. | |
| 5,659,480 A | 8/1997 | Anderson et al. | |
| 5,706,589 A | 1/1998 | Marc | |

(Continued)

FOREIGN PATENT DOCUMENTS

EP    1422128 A2    5/2004

(Continued)

OTHER PUBLICATIONS

International Search Report and Written Opinion, PCT/US06/22582, Feb. 2, 2007, 8 pages.

(Continued)

*Primary Examiner* — Khoi Tran
*Assistant Examiner* — Dale Moyer
(74) *Attorney, Agent, or Firm* — Fenwick & West LLP; Mark Duell

(57) ABSTRACT

A motion controlled system for a robotic system stores energy when the robotic system uses negative power and releases the stored energy when the robotic system uses positive power. The motion controlled system calculates the power for causing the robotic system to follow a prescribed motion and applies the appropriate control signals to the robotic system in response to detected parameters of the robotic system.

21 Claims, 8 Drawing Sheets

U.S. PATENT DOCUMENTS

| | | | |
|---|---|---|---|
| 5,709,219 | A | 1/1998 | Chen et al. |
| 5,808,433 | A | 9/1998 | Tagami et al. |
| 5,835,693 | A | 11/1998 | Lynch et al. |
| 5,894,205 | A | 4/1999 | Shimizu et al. |
| 5,942,869 | A | 8/1999 | Katou et al. |
| 5,982,389 | A | 11/1999 | Guenter et al. |
| 6,045,524 | A | 4/2000 | Hayashi et al. |
| 6,076,025 | A | 6/2000 | Ueno |
| 6,152,890 | A | 11/2000 | Kupfer et al. |
| 6,161,080 | A | 12/2000 | Aouni-Ateshian et al. |
| 6,204,619 | B1 | 3/2001 | Gu et al. |
| 6,222,338 | B1 | 4/2001 | Villaret |
| 6,289,265 | B1 | 9/2001 | Takenaka et al. |
| 6,445,983 | B1 | 9/2002 | Dickson et al. |
| 6,505,096 | B2 | 1/2003 | Takenaka et al. |
| 6,580,969 | B1 | 6/2003 | Ishida et al. |
| 6,633,783 | B1 | 10/2003 | Dariush et al. |
| 6,640,160 | B2 | 10/2003 | Takahashi et al. |
| 6,750,866 | B1 | 6/2004 | Anderson, III |
| 6,766,204 | B2 | 7/2004 | Niemeyer et al. |
| 6,785,591 | B1 | 8/2004 | Hansson |
| 6,845,295 | B2 | 1/2005 | Cheng et al. |
| 6,915,150 | B2 | 7/2005 | Cinquin et al. |
| 6,943,520 | B2 | 9/2005 | Furuta et al. |
| 6,971,267 | B2 | 12/2005 | Kawai et al. |
| 7,010,390 | B2 | 3/2006 | Graf et al. |
| 7,013,201 | B2 | 3/2006 | Hattori et al. |
| 7,024,279 | B2 | 4/2006 | Rose, III et al. |
| 7,112,938 | B2 | 9/2006 | Takenaka et al. |
| 7,135,003 | B2 | 11/2006 | Dariush |
| 7,184,858 | B2 | 2/2007 | Okazaki et al. |
| 7,191,036 | B2 | 3/2007 | Takenaka et al. |
| 7,260,450 | B2 | 8/2007 | Okazaki et al. |
| 7,278,954 | B2 | 10/2007 | Kawai et al. |
| 7,333,111 | B2 | 2/2008 | Ng-Thow-Hing et al. |
| 7,386,366 | B2 | 6/2008 | Dariush |
| 7,390,309 | B2 | 6/2008 | Dariush |
| 7,402,142 | B2 | 7/2008 | Kawai et al. |
| 7,431,707 | B2 | 10/2008 | Ikeuchi |
| 7,469,166 | B2 | 12/2008 | Dariush |
| 7,646,161 | B2 | 1/2010 | Albu-Schaffer et al. |
| 7,650,204 | B2 | 1/2010 | Dariush |
| 2003/0018283 | A1 | 1/2003 | Dariush |
| 2003/0023415 | A1 | 1/2003 | Nakamura et al. |
| 2003/0115031 | A1 | 6/2003 | Dariush et al. |
| 2003/0223844 | A1 | 12/2003 | Schiele et al. |
| 2004/0031169 | A1 | 2/2004 | Jensen et al. |
| 2004/0102723 | A1 | 5/2004 | Horst |
| 2004/0107780 | A1 | 6/2004 | Kawai et al. |
| 2004/0116836 | A1 | 6/2004 | Kawai et al. |
| 2004/0158175 | A1 | 8/2004 | Ikeuchi et al. |
| 2004/0176875 | A1 | 9/2004 | Iribe et al. |
| 2004/0193318 | A1 | 9/2004 | Ito |
| 2004/0249319 | A1 | 12/2004 | Dariush |
| 2004/0254771 | A1 | 12/2004 | Riener et al. |
| 2005/0070834 | A1 | 3/2005 | Herr et al. |
| 2005/0102111 | A1 | 5/2005 | Dariush et al. |
| 2005/0104548 | A1 | 5/2005 | Takenaka et al. |
| 2005/0209535 | A1 | 9/2005 | Dariush |
| 2006/0046909 | A1 | 3/2006 | Rastegar et al. |
| 2006/0100818 | A1 | 5/2006 | Nakamura et al. |
| 2006/0139355 | A1 | 6/2006 | Tak et al. |
| 2006/0173578 | A1 | 8/2006 | Takenaka et al. |
| 2006/0282022 | A1 | 12/2006 | Dariush |
| 2006/0293791 | A1 | 12/2006 | Dariush |
| 2007/0123997 | A1 | 5/2007 | Herr et al. |
| 2007/0124023 | A1* | 5/2007 | Schulte .................. 700/245 |
| 2008/0139968 | A1 | 6/2008 | Endo et al. |
| 2009/0105877 | A1* | 4/2009 | Hellstrom et al. ............ 700/245 |

FOREIGN PATENT DOCUMENTS

| | | |
|---|---|---|
| JP | 2000-249570 | 9/2000 |
| JP | 2003-103480 | 4/2003 |
| JP | 2005-527004 | 9/2005 |
| RU | 2 107 328 C1 | 3/1998 |
| WO | WO 00/35346 | 6/2000 |
| WO | WO 2003/002967 | 1/2003 |

OTHER PUBLICATIONS

Wyeth, G. F., et al., "Distributed Digital Control of a Robot Arm," Proceedings of the Australian Conference on Robotics and Automation (ACRA 2000), Aug. 30-Sep. 1, 2000, pp. 217-222, [online] [retrieved on Dec. 31, 2006] Retrieved from the Internet: <URL: www.itee.uq.edu.au/~wyeth/Publications/puma.pdf>, Section 2.3 Power Electronics: Section 1.4 Power Supply, Section 1.1 PUMA 560 Robot.

First Office Action of the State Intellectual Property Office issued by the People's Republic of China, Application No. 200710110254.9, Jan. 16, 2009, 8 Pages.

Notice of Grounds for Rejection Office Action issued by the Japan Patent Office, Application No. 2003-508905, Oct. 14, 2008, 7 Pages.

Notice of Grounds for Rejection Office Action issued by the Japan Patent Office, Application No. 2007-552186, Jan. 6, 2009, 8 Pages.

Bhushan, N., et al., "Computational nature of human adaptive control during learning of reaching movements in force fields," Biological Cybernetics, Jan. 26, 1999, p. 39-60, vol. 81.

Goel, P., The Inverse Kinematics Solution, Closed-Form Dynamics and Simulation of AdeptOne Industrial Robot, IEEE, 1988, pp. 1688-1693.

Hardt, M., et al., "The Role of Motion Dynamics in the Design, Control and Stability of Bipedal and Quadrupedal Robots," RoboCup 2002, International Symposium, Jun. 24-25, 2002, pp. 1-16.

Kuster, M., et al., "Joint load considerations in total knee replacement," The Journal of Bone and Joiny Surgery, Jan. 1997, p. 109-113, vol. 79-B, No. 1.

Notice of Grounds for Rejection—Office Action, Japanese Patent Application No. 2003-508905, May 27, 2008, 9 Pages.

Supplementary European Search Report, European Patent Application No. EP 06750178, Apr. 21, 2008, 6 Pages.

Office Action, Canadian Patent Application No. 2,451,630, Jul. 22, 2008, 2 Pages.

Examination Report, European Patent Application No. EP 06748964, Jul. 22, 2008, 5 Pages.

Asensio, J., et al., "A Kinematic and Dynamic Model-Based Motion Controller for Mobile Robots," IFAC, 2002.

Wu, G., et al., "The Study of Kinematic Transient in Locomotion Using the Integrated Kinematic Sensor," IEEE, Sep. 1996, pp. 193-200, vol. 4, No. 3.

PCT International Search Report and Written Opinion, PCT/US06/01116, Jan. 17, 2008.

PCT International Search Report and Written Opinion, PCT/US06/01250, May 16, 2008.

Supplementary European Search Report, EP 06748964, Mar. 14, 2008.

Supplementary European Search Report, EP 06750178, Mar. 14, 2008.

PCT International Search Report and Written Opinion, PCT/US06/14069, Aug. 31, 2007, 8 pages.

PCT International Search Report and Written Opinion, PCT/US06/01343, Aug. 15, 2007, 8 pages.

Agarwal, S.K. et al., "Theory and Design of an Orthotic Device for Full or Partial Gravity-Balancing of a Human Leg During Motion," IEEE Transactions on Neural Systems and Rehabilitation Engineering, Jun. 2004, vol. 12, No. 2.

Akhlaghi, F. et al., "In-shoe Biaxial Shear Force Measurement: the Kent Shear System," Medical & Biological Engineering & Computing, Jul. 1996, vol. 34, pp. 315-317.

Anderson, F. et al., "Static and Dynamic Optimization Solutions for Gait are Practically Equivalent", Journal of Biomechancis, 2001, vol. 34, pp. 153-161.

Anderson, F. et al., "Dynamic Optimization of Human Walking," Journal of Biomechanical Engineering, Oct. 2001, vol. 123, pp. 381-390.

Anderssen, R. et al., "Numerical Differentiation Procedures for Non-Exact Data," Numererische Mathematik, 1974, vol. 22, pp. 157-182.

Atkeson, C.G., "Learning Arm Kinematics and Dynamics", Annual Reviews, Inc., 1989, vol. 12, pp. 157-183.

Baruh, H., Analytical *Dynamics*, Chapter 7, Rigid Body Kinematics, McGraw-Hill, 1999, pp. 355-371.

"Berkeley Researchers Developing Robotic Exoskeleton That Can Enhance Human Strength and Endurance,"ScienceDaily LLC, 1995-2004, [online] [Retrieved on Oct. 9, 2006] Retrieved from the Internet<URL:http://bleex.me.berkeley.edu/bleexhistPDFs/sciencedaily.pdf>.

Blaya, J., "Force-Controllable Ankle Foot Orthosis (AFO) to Assist Drop Foot Gait," Feb. 2003, [online] [Retrieved on Oct. 9, 2006] Retrieved from the Internet<URL:http:web.mit.edu/jblaya/www/MSthesis_final.pdf>.

Bronzino, J.D., ed., "The Biomedical Engineering Handbook", IEEE Press, $2^{nd}$ Ed. vol. 2, 2000, Chapter 142, pp. 1-17.

Burdea, G. et al., "Virtual Reality Technology", 1994, pp. 33-37, John Wiley and Sons, Inc.

Busby, H.R. et al., "Numerical Experiments With a New Differentiation Filter," Transactions of the ASME—Journal of Biomechanical Engineering, Nov. 1985, vol. 107, pp. 293-299.

Chao, E.Y. et al., "Application of Optimization Principles in Determining the Applied Moments in Human Leg Joints During Gait," J. Biomechanics, 1973, vol. 6, pp. 497-510, Pergamon Press, Great Britain.

Craig, J.J., "Nonlinear Control of Manipulators," Introduction to Robotics Mechanics and Control, $2^{nd}$. Ed., 1989, Chapter 10, pp. 333-361.

Crowninshield, R.D. et al., "A Physiologically Based Criterion of Muscle Force Prediction in Locomotion," *Journal of Biomechanics*, vol. 14, No. 11, 1981, pp. 793-801.

Cullum, J., "Numerical Differentiation and Regularization," SIAM J. Numer. Anal., Jun. 1971, vol. 8, No. 2, pp. 254-265.

Dariush, B. et al., "Multi-Modal Arialysis of Human Motion From Extemal Measurements," Transactions of the ASME, Jun. 2001, vol. 123, pp. 272-278.

Dariush, B, "A Novel Algorithm for Generating a Forward Dynamics Solution to the Traditional Inverse Dynamics Problem," In *4th World Congress of Biomechanics*, Calgary, Canada, 2002.

Dariush, B., "A Forward Dynamics Solutions to Multi-Modal Inverse Dynamics Problems," In *International Society of Biomechanics, XIXth Congress*, Dunedin, NZ, 2003.

Dariush, B., "A Well-Posed, Embedded Constraint Representation of Joint Moments From Kinesiological Measurements," Journal of Biomechanical Engineering, Aug. 2000, vol. 122, pp. 437-445.

Delp, S. et al., "A Computational Framework for Simulating and Analyzing Human and Animal Movement," *IEEE Computing in Science and Engineering*; vol. 2, No. 5, 2000, pp. 46-55.

Dohrmann, C.R. et al., "Smoothing Noisy Data Using Dynamic Programming and Generalized Cross-Validation" Transactions of the ASME—Journal of Biomechanical Engineering, Feb. 1988, vol. 110, pp. 37-41.

Durfee, W.K., "Preliminary Design and Simulation of a Pneumatic, Stored-Energy, Hybrid Orthosis for Gait Restoration," Proceedings of IMECE04, 2004 ASME International Mechanical Engineering Congress, Nov. 13-20, 2004, [online] [Retrieved on Oct. 9, 2006] Retrieved from the Internet<URL: http://www.me.umn.edu/~wkdurfee/publications/IMECE2004-60075.pdf >.

Flanagan, R.J., et al., "The Role of Internal Models in Motion Planning and Control: Evidence from Grip Force Adjustments During Movements of Hand-Held Loads", The Journal of Neuroscience, Feb. 15, 1997, vol. 17(4), pp. 1519-1528.

Gagnon, D. et al., "The Influence of Dynamic Factors on Triaxial Net Muscular Moments at the L5/S1 Joint During Asymmetrical Lifting and Lowering", Journal of Biomechanics, vol. 25, pp. 891-901, 1992.

Gagnon, M. et al., "Muscular Mechanical Energy Expenditure as a Process for Detecting Potential Risks in Manual Materials Handling," J. Biomech., Nov. 1991, pp. 191-203, vol. 24, No. 3/ 4.

Giakas, G. et al., "A Comparison of Automatic Filtering Techniques Applied to Biomechanical Walking Data," J Biomechanics, 1997, vol. 00, No. 00, 4 pages.

Giakas, G. et al., "Optimal Digital Filtering Requires a Different Cut-Off Frequency Strategy for the Determination of the Higher Derivatives," J. Biomechanics, Apr. 1997, vol. 28, No. 00, 5 pages.

Grood, E.S. et al., "A Joint Coordinate System for the Clinical Description of Three Dimensional Motions: Application to the Knee," Journal of Biomechanical Engineering, 1983, pp. 136-144, No. 105.

Gruber, K., et al., "A Comparative Study of Impact Dynamics: Wobbling Mass Model Versus Rigid Body Models", Journal of Biomechanics, 31 (1998), pp. 439-444.

Hatze, H. "The Use of Optimally Regularized Fourier Series for Estimating Higher-Order Derivatives of Noisy Biomechanical Data," J. Biomechanics, 1981, vol. 14, pp. 13-18.

Hayashibara, Y. et al., "Design of a Power Assist System with Consideration of Actuator's Maximum Torque," $4^{th}$ IEEE International Workshop on Robot and Human Communication, Jul. 5-7, 1995, RO-MAN'95, Tokyo, pp. 379-384, [online] [Retrieved on Nov. 22, 2006] Retrieved from the Internet<URL:http://ieeexplore.ieee.org/xpl/abs_free.jsp?arNumber=531990>.

Hemami, H., "A Feedback On-Off Model of Biped Dynamics", IEEE Transactions on Systems, Man, and Cybernetics, Jul. 1980, vol. SMC-10, No. 7, pp. 376-383.

Hemami, H. et al., "Modeling and Control of Constrained Dynamic Systems With Application to Biped Locomotion in the Frontal Plane," *IEEE Transactions on Automatic Control*, vol. 4, No. 4, Aug. 1979, pp. 526-535.

Hemami, H., "A State Space Model for Interconnected Rigid Bodies," IEEE Trans. on Automatic Control, 1982, pp. 376-382, vol. 27, No. 2.

Hosein, R. et al., "A Study of In-shoe Plantar Shear in Normals," Clinical Biomechanics, 2000, vol. 15, pp. 46-53.

Hsiang, S.H. et al., "Three Different Lifting Strategies for Controlling the Motion Patterns of the External Load", Ergonomics, vol. 40, pp. 928-939, 1997.

Hungspreugs, P. et al., "Muscle Force Distribution Estimation Using Static Optimization Techniques", Technical Report—Honda R&D Americas.

International Search Report and Written Opinion, PCT/US06/11727, Nov. 9, 2006, 9 pages.

Isaacs, P.M. et al., "Controlling Dynamic Simulation with Kinematic Constraints, Behavior Functions, and Inverse Dynamics," Computer Graphics, Jul. 1987, pp. 215-224, vol. 21, No. 4.

Jalics, L. et al., "A Control Strategy for Terrain Adaptive Bipedal Locomotion," Autonomous Robots, 1997, pp. 243-257, vol. 4.

Jezernk, S. et al., "Robotic Orthosis Lokomat: A Rehabilitation and Research Tool," Neuromodulation, 2003, pp. 108-115, vol. 6, No. 2.

Kato, H. et al., "The Concept of a Walking Assistance Suit", The Japanese Society of Mechanical Engineers, Aug. 2001.

Kawato, M., "Adapation and Learning in Control of Voluntary Movement by the Central Nervous System", 1989, Advanced Robotics, vol. 3, pp. 229-249.

Kawato, M., et al., "The Cerebellum and VOR/OKR Learning Models", Elsevier Science Publishers Ltd., 1992, vol. 15, No. 11, pp. 445-453.

Kawato, M., "Internal Models for Motor Control and Trajectory Planning," Current Opinion in Neurobiology, 1999, pp. 718-727, No. 9.

Khatib, O., A Unified Approach for Motion and Force Control of Robot Manipulators: The Operational Space Formulation, *IEEE Journal of Robotics and Automation*, RA-3(1), 1987, pp. 43-53.

Klein, C. A. et al., Review of Pseudoinverse Control for Use With Kinematically Redundant Manipulators, *IEEE Transactions on Systems, Man, and Cybernetics*, vol. 13, No. 2, 1983, pp. 245-250.

Madigan, R.R., "Ankle-Foot Orthoses (AFO's) in Spastic Cerebral Palsy," Fillauer LLC, [online] [Retrieved on Oct. 9, 2006] Retrieved from the Internet<URL:http://www.fillauer.com/education/ED_afo.html#dynamic>.

Mihelj, M. et al., "Unsupported Standing with Minimized Ankle Muscle Fatigue," IEEE Transactions on Biomedical Engineering, Aug. 2004, vol. 51, No. 8, pp. 1330-1340, [online] [Retrieved on Oct. 9, 2006] Retrieved from the Internet<URL:http://ieeexplore.ieee.org/iel5/10/29163/01315854.pdf>.

Park, J.H. et al., "Biped Robot Walking Using Gravity-Compensated Inverted Pendulum Mode and Computed Torque Control," 1998 IEEE Conference on Robotics and Automation, May 16-20, 1998, vol. 4, pp. 3528-3533, [online] [ Retrieved on Nov. 22, 2006] Retrieved from the Internet<URL:http://ieeexplore.ieee.org/xpl/abs_free.jsp?arNumber=680985>.

Piazza, S. et al., "Three-Dimensional Dynamic Simulation of Total Knee Replacement Motion During a Step-up Task," *Journal of Biomechanical Engineering*, vol. 123, 2001, pp. 599-606.

Pratt, G.A. et al., "Active Orthotics for Helping the Neuromuscularly Impaired to Walk," [online] [Retrieved on Oct. 9, 2006] Retrieved from the Internet<URL:http:// www.vcl.uh.edu/~rcv03/materials/grant/9733740.1064791086.pdf>.

Rahman, T. et al., "A Simple Technique to Passively Gravity-Balance Articulated Mechanisms," Journal of Mechanical Design, 1995, pp. 655-658, vol. 117, No. 4.

"Regenerative Foot Braking," [online] [Retrieved on Oct. 9, 2006] Retrieved from the Internet<URL:http://www.halfbakery.com/idea/regenerative_20foot_20braking#1069693200>.

Runge, C.F. et al., "Estimating Net Joint Torques From Kinesiological Data Using Optimal Linear System Theory." IEEE Transactions on Biomedical Engineering, Dec. 1995, vol. 42, No. 12, pp. 1158-1164.

"Sensorless Fet Element DC Motor Driver," [online] [Retrieved on Oct. 9, 2006] Retrieved from the Internet<URL:http://robotx.sourceforge.net/bridge/bridge.shtml>.

Shadmehr, R. et al., "Interference in Learning Internal Models of Inverse Dynamics in Humans," Advances in Neural Information Processing Systems, 1995, pp. 1117-1224, Chapter 7.

Shadmehr, R., "Learning Virtual Equilibrium Trajectories for Control of a Robot Arm", Neural Computation, 1990, vol. 2, pp. 436-446.

Simons, W. et al., "Differentiation of Human Motion Data Using Combined Spline and Least Squares Concepts," Journal of Biomechanical Engineering, Transactions of the ASME, Aug. 1991, vol. 113, pp. 348-351.

Thelen, D. et al., "Generating Dynamic Simulations of Movement Using Computed Muscle Control," *Journal of Biomechanics*, 36, 2003, pp. 321-328.

Transmittal of the International Search Report, PCT/US02/20829, Dec. 12, 2002, 4 pages.

Trost, F.J., "Energy-Storing Feet," JACPOC, 1989, vol. 24, No. 4, [online] [Retrieved on Oct. 9, 2006] Retrieved from the Internet<URL:http://jacpoc.oandp.com/library/1989_04_082.asp>.

Vaughan, C. L. et al., "Appendix B., Detailed Mathematics Used in GaitLab," *Dynamics of Human Gait*, Second Edition, Kiboho Publishers, Cape Town South Africa, 1999, pp. 83-106.

Vukobratovic, M. et al., *Scientific Fundamentals of Robotics 7: Biped Loco-motion*. Springer-Verlag, 1990, pp. 17-27.

Wells, R. et al., "Internal and Physiological Responses During Concentric and Eccentric Cycle Ergometry," Eur. J. Appl. Physiol., 1986, pp. 291-301, vol. 55.

Winter, D.A., "Biomechanics and Motor Control of Human Movement", $2^{nd}$ Edition, John Wiley & Sons, Inc., pp. 51-74.

Winter, D.A., "Kinetics: Forces and Moments of Force," Biomechanics and Motor Control of Human Movement, $2^{nd}$ Ed., New York, 1990, Chapter 4.

Wittenberg, J., *Dynamics of Systems of Rigid Bodies*, 1977, B.G. Teubner Stuttgart, 1977, p. 29-30.

Wolpert, D.M., et al., "Ocular Limit Cycles Induced by Delayed Retinal Feedback", Experimental Brain Research, 1993, vol. 96, pp. 173-180.

Woltring, H.J., "A Fortran Package for Generalized, Cross Validatory Spline Smoothing and Differentiation," Adv. Eng. Software, 1986, vol. 8, No. 2, pp. 104-107.

Woltring, H.J., "On Optimal Smoothing and Derivative Estimation From Noisy Displacement Data in Biomechanics," Human Movement Science, vol. 4, 1985, pp. 229-245.

Written Opinion, PCT/IB02/04311, Feb. 20, 2003, 2 pages.

Zajac, F.E., "Muscle and Tendon Properties, Models, Scaling, and Application to Biomechancis and Motor Control", 1989, vol. 17, Issue 4, pp. 359-411.

Japanese Patent Office Notification, Japanese Application No. JP 2007-552190, Oct. 26, 2010, seven pages.

Japanese Patent Office Notification, Japanese Application No. JP 2007-552180, Mar. 22, 2011, four pages.

Nagai, K. et al., "Design of Robotic Orthosis Assisting Human Motion in Production Engineering and Human Care," ICORR '99: International Conf. on Rehabilitation Robotics, pp. 270-275, Stanford, California, USA.

European Patent Office, Examination Report, Patent No. EP 05 732 877.5, Mar. 9, 2011, five pages.

Japanese Patent Office, Notification of Reasons for Refusal, Japanese Patent Application No. JP 2008-515988, Jul. 19, 2011, six pages.

Japanese Patent Office, Decision of Rejects, Japanese Patent Application No. JP 2007-552180, Aug. 9, 2011, nine pages.

European Patent Office, Examination Report, European Patent Application No. 05 732 877.5, Sep. 29, 2011, five pages.

* cited by examiner

REGENERATIVE ACTUATION IN MOTION CONTROL

RELATED APPLICATIONS

This application claims the benefit of and priority from U.S. provisional application No. 60/689,502 which is incorporated by reference herein in its entirety.

This application is related to U.S. patent application Ser. No. 11/402,487 filed on Apr. 11, 2006; U.S. patent application Ser. No. 11/395,654, filed on Mar. 30, 2006; U.S. patent application Ser. No. 11/038,978 filed on Jan. 19, 2005; U.S. patent application Ser. No. 11/038,692 filed on Jan. 19, 2005; U.S. patent application Ser. No. 11/038,691 filed on Jan. 19, 2005; U.S. patent application Ser. No. 10/151,647 filed on May 16, 2002; U.S. provisional application No. 60/301,891 filed on Jun. 29, 2001; No. 60/353,378 filed on Jan. 31, 2002; and No. 60/670,732 filed on Apr. 12, 2005, the contents of all are incorporated by reference herein in their entirety.

FIELD OF THE INVENTION

The present invention relates to motion control, and more particularly to motion control with regenerative actuation.

BACKGROUND OF THE INVENTION

Locomotion of robotic or bio-robotic systems such as humanoid robots or exoskeletons typically involves periods of energy generation and energy absorption at each body segment. The generated energy is associated with positive work and is typically produced from actuation, external forces, and/or the natural dynamics of the system. The absorbed energy is associated with negative work, or the energy that is to be dissipated by antagonist actuation, external forces, or through passive structures in the system. In humans, the energy absorption phase, typically associated with deceleration of the limbs is achieved through a combination of antagonist muscle activation and the passive elements in the muscles and other supporting structures in the joint. In robotic systems, such as humanoids, the energy is sometimes absorbed through motor clutches, passive structures in the system, or by reverse actuation. In reverse actuation, the motors generate torque that opposes the angular velocity of the segment. However, generating torque that opposes the angular velocity of the segment is highly inefficient in terms of power consumption.

What is needed is a system and method for providing more efficient power consumption for robotic and bio-robotic systems.

SUMMARY OF THE INVENTION

A method for controlling a motion controlled system includes computing power for executing a motion that may or may not be predetermined; generating a first control signed to apply energy to the motion controlled system if the computed power is above a first predetermined level; generating a second control signal to draw energy from the motion controlled system if the computed power is below a second predetermined level; and generating a third control signal to store the energy drawn from the motion controlled system. The motion controlled system may be a robotic joint.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

The system and method provides a motion controlled system for a robotic system that stores energy when the robotic system uses negative power and that releases the stored energy when the robotic system uses positive power. The motion controlled system calculates the power for causing the robotic system to follow a prescribed motion and applies the appropriate control signals to the robotic system in response to detected parameters of the robotic system.

For a robotic system for human locomotion, the system absorbs and stores energy in an ankle and decelerates when a heel strikes the ground. As the gait continues, the system releases the stored energy.

1 System

Figure 1:
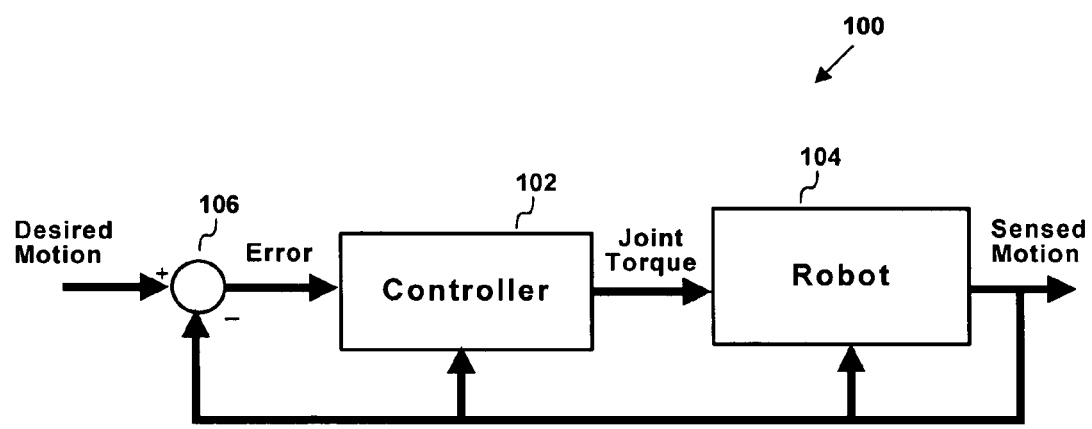
FIG. 1 is a block diagram illustrating a motion controlled system for controlling a robotic/bio-robotic system according to one embodiment of the present invention.

FIG. 1 is a block diagram illustrating a motion controlled system 100 for controlling a robotic/bio-robotic system according to one embodiment of the present invention. The motion controlled system 100 comprises a controller 102, a robot 104, and a summer 106. The robot 104 may be, for example, a humanoid robot, or a wearable human exoskeleton system. The robot 104 includes actuators for controlling the motion of the robot in response to control signals from the controller 102. The controller 102 generates the control signals based on a desired motion and feedback, such as position and angular velocity, from the robot 104. The controller 102 may be a processor of any known type.

In one embodiment, the robot 104 is an orthosis controlled by an actuator, such as an Ankle Foot Orthosis. The initial step in the control process of the controller 102 may be to generate the desired trajectory of the robot 104. One embodiment of the present invention provides several methods for computing a trajectory in multi-dimensional space that describes the desired motion of the robot 104. A trajectory described in joint space can be specified by the vector q, and determines the motion of each degree of freedom, its velocity, and its acceleration. Alternatively, a trajectory can be described in task space by a set of Cartesian variables which are related to joint varibles q. For example, depending on the application, the desired motion of the system can be planned off-line, or generated at run-time using a variety of trajectory generation schemes. In another embodiment, the user specifies only the desired goal position and orientation of a point on the robot, and the controller 102 determines the exact shape of the path to get there, the duration, the velocity profile, and other details.

Many types of controllers 102 can be designed to achieve the desired motion. For example, an inverse dynamics based tracking controller can be used to generate the control commands that when applied to the robot, will reproduce the desired motion. For example, the controller 102 may be one of those described in the related patent applications cited above and incorporated herein by reference.

The control objective may not necessarily be trajectory tracking. Other performance criteria such as stability, balance, energy minimization, etc. may also be used when designing the controller 102. In general, the function of the controller 102 is to produce the control action (typically specified as a force or torque) that will generate a motion satisfying a specified performance criterion. The control action is transformed to a quantity that is accepted as input by the actuators of the robot 104, such position commands, current, or voltage.

As an overview, controlled motion of any physical system (or load) involves periods of energy generation as well as energy absorption. Energy is generated in order for a physical system to do positive work while energy is absorbed if the work is negative. Energy can be put into a system in different ways. For example, externally powered actuators or external forces may deliver energy to a system. Energy may also be added as a result of the system's natural dynamics. For example, gravitational forces can convert potential energy into kinetic energy, thereby producing energy. Like energy generation, energy may also be absorbed in different ways. In motion control, a typical way to absorb (or dissipate) energy is through externally powered antagonistic (or reverse) actuation. Energy may also be dissipated by an external force. In one embodiment, energy is absorbed through passive structures, such as springs and dampers.

During periods of energy generation or absorption, actuators in most physical systems use supply power, regardless of the direction in the power flow. In principal, there is no need to supply power to the actuators during the energy absorption phase if, for example, the absorbed energy can be precisely controlled and dissipated passively. Furthermore, the dissipated energy can be potentially stored and later recovered by a regenerative mechanism. The ability to identify the generation or absorption phase during the operation of the system, coupled with an approach to passively control and regenerate the absorbed energy can significantly reduced the power requirements in motion controlled systems.

Although, energy regeneration in hybrid-electric vehicles is an example where energy is recovered when a load is decelerated, that technology currently does not involve the motion control problem considered here. In particular, the control action to decelerate the vehicle is not based on tracking a prescribed motion profile. Rather, an integral part of the controller is a human in-the-loop which provides the necessary feedback to decelerate the vehicle. Furthermore, the bandwidth of the control in hybrid-electric vehicles is much different from the majority of applications using motion control. The system 100 of the present invention is described for the control of single, or multi-link rigid body mechanical systems, such as industrial robots, humanoid robots, or wearable human exoskeletons. However, the principles of regenerative actuation and control of the system 100 apply to control of any physical system.

The energetics of motion controlled systems are described herein through power analysis. A systematic procedure identifies the energy absorption phase and the energy generation phase of the system 100 that is controlled to follow a prescribed motion. Based on these criteria, a hybrid actuator system may be designed and integrated into the robot 104 of the motion controlled system whereby the actuation mechanism provides active control, or passive control and regeneration, depending on the direction of the power flow. One example is an actuator/control mechanism to regeneratively control a single link inverted pendulum by using spring based actuation as described below in conjunction with FIG. 6. Spring based actuation concepts have the advantage that springs come in a variety of shapes and sizes and are available in large quantities. An actuator constructed upon the properties of a spring is intrinsically compliant and can dissipate energy. Furthermore, the use of a spring as part of the actuator allows the use of stored energy. One of the first realizations of a compliant actuator was the MIT Series Elastic Actuator. See, for example, G. A. Pratt and W. M. Williamson, "Series elastic actuators", *IEEE Int'l Conf. on Intelligent Robots and Systems*, pages 399-406 (1995), the contents of which are incorporated herein in their entirety. However, the spring stiffness in the Series Elastic Actuator could not be modulated. A spring actuator that can adjust its stiffness will have a resonance behavior over a range of frequencies. In order for an actuator to passively control the force or torque, a variable compliance actuator is used. One such actuator is described in J. W. Hurst, J. E. Chestnut, and A. A. Rizzi, "An actuator with physically variable stiffness for highly dynamic legged locomotion", *IEEE Int'l Conf. on Robotics and Automation*, pages 4662-4667, New Orleans, La., (2004), the contents of which are incorporated herein in their entirety.

2 Energetic Studies of Human Locomotion

The mechanical energies are excellent means of quantifying and describing the efficiencies associated with the controller 102. The instantaneous power calculation at each joint reveals whether energy is absorbed or generated. If the computed power at a given joint is positive, then the actuators are doing positive work and energy is delivered to the segment. If joint power is negative, then energy is absorbed by the system. The controller 102 controls the delivery of power to the segment and the absorption of the energy by the system.

In order to illustrate the positive and negative power flows, the energetics of human motion during gait are considered. Human motion analysis is compelling because the body segment parameters, as well as kinesiological measurements such as ground reaction forces and motion capture are readily available, providing the necessary inputs to determine joint torques and joint powers. Furthermore, human motion analysis provides insight about the bandwidth requirements in applications involving humanoid robots, or wearable human exoskeleton systems.

Figure 2:
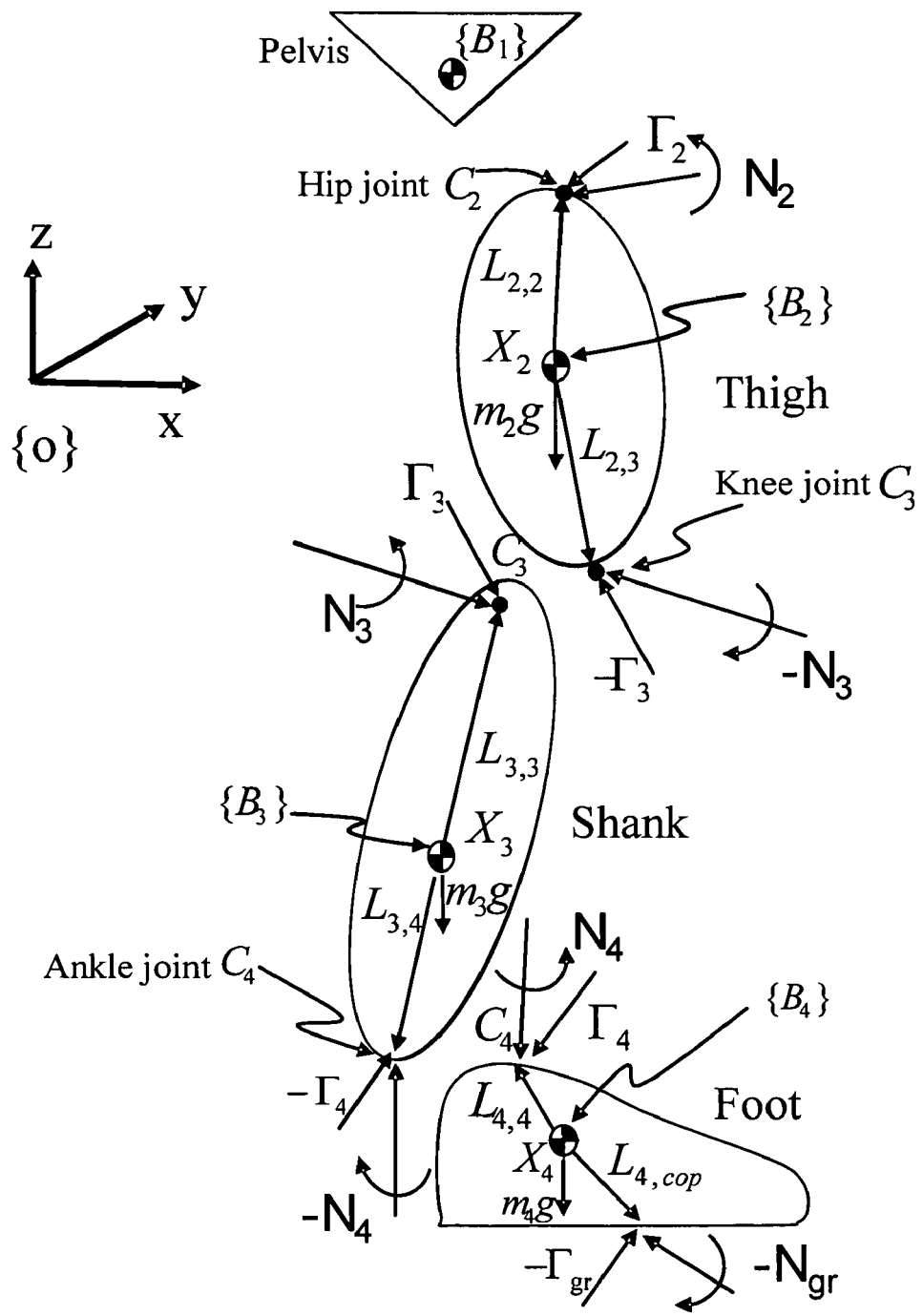
FIG. 2 is a diagram illustrating a free body diagram of human lower extremity for one side of the body with forces and moments acting thereon.
Figure 7:
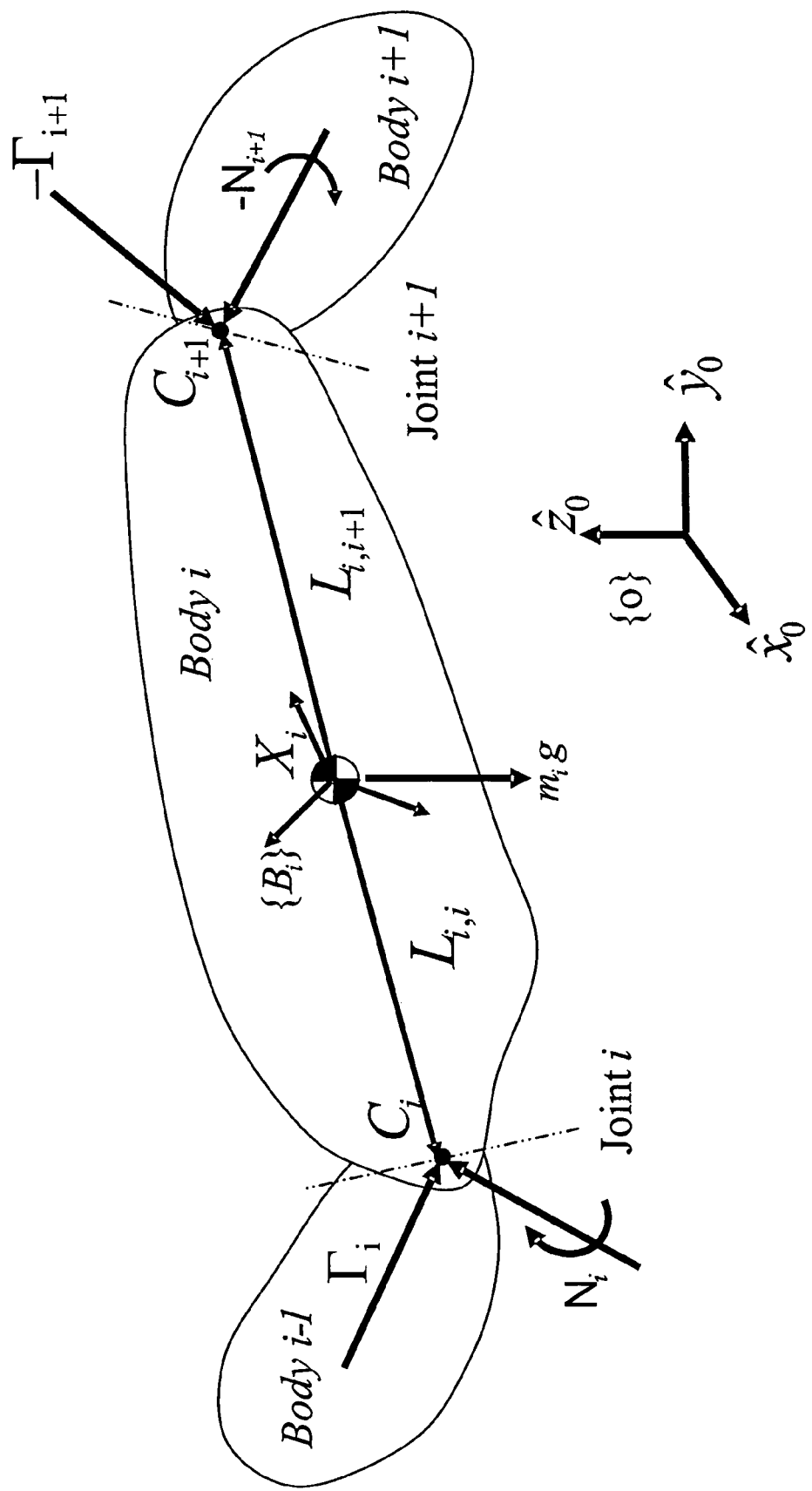
FIG. 7 is a free body diagram illustrating of a single body with forces and moments acting thereon.

FIG. 2 is a diagram illustrating a free body of human lower extremity for one side of the body with forces and moments acting thereon. FIG. 7 is a free body diagram illustrating of a single body with forces and moments acting thereon. The free body of FIG. 2 may be analyzed as single bodies such as shown in FIG. 2.

For the sake of clarity, the pelvis, thigh, shank and foot are shown spaced apart, but these parts are coupled at joints $C_2$, $C_3$ and $C_4$. The body segments are enumerated starting with the pelvis ($B_1$) and working outward to the foot ($B_4$) and the $B_i$ pointing to the center of mass of the body segment. The body segments have a mass $m_i$. The ground reaction force and moment, denoted by $\Gamma_{gr}$ and $N_{gr}$ respectively, correspond to the reaction loads acting at the distal end of the last segment in the chain, for example, the foot. The point of application of the ground reaction force is the center of pressure (cop).

To determine the joint powers at the ankle, knee, and hip, standard gait measurements including motion capture and force plate data were obtained from the Gait CD. See, for example, C. L. Vaughan, B. Davis, and J. O'Connor. *Dynamics of Human Gait*, Kiboho Publishers, Cape Town South Africa, 2nd edition (1999), the contents of which are incorporated herein in their entirety. The gait data obtained from the Gait CD contained 15 lower extremity marker data based on the Helen Hayes marker set, anthropometric measurements such as limb-dimensions and body bass, and force plate data under two feet. The marker and anthropometric data were used to calculate the body segment parameters and joint centers based on the statistical regression equations provided by Vaughan et al, noted above. The marker data were filtered using a second order Butterworth low-pass filter with a cut-off frequency of 6 HZ. The force plate data was filtered at 50 HZ. The sampling frequency of the marker data was 60 HZ. The Euler angles and center of gravity of each body segment were calculated in order to determine the generalized coordinates (or configuration) of each segment.

At a particular joint, the inner product of the joint moments (denoted by N) and the joint angular velocities, (denoted by W) are then used to determine the joint powers. The power P is calculated as follows:

$$P = N^T W \quad (1)$$

Figure 3:
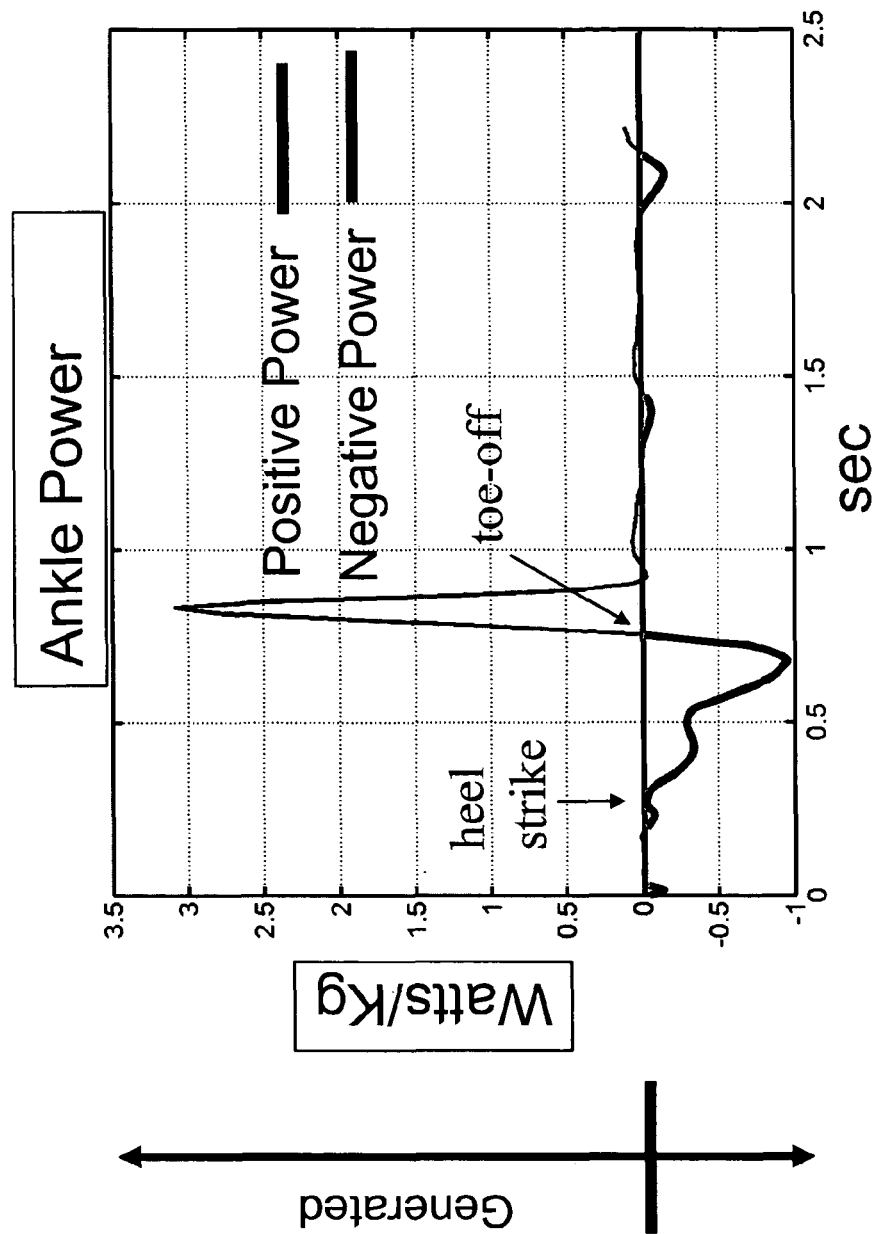
FIG. 3 is a timing diagram of ankle joint power generated or absorbed during one cycle of gait.
Figure 4:
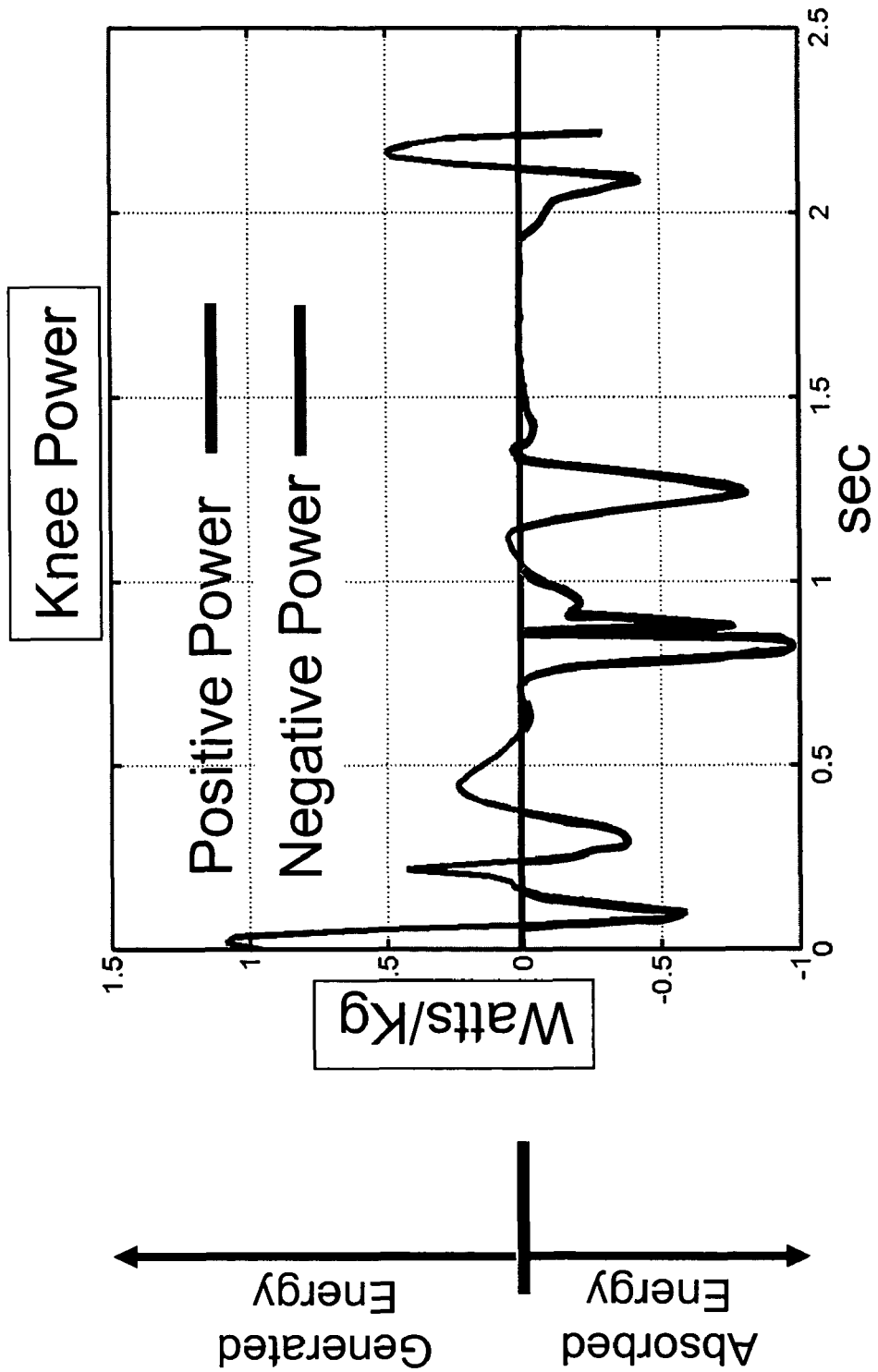
FIG. 4 is a timing diagram of knee joint power generated or absorbed during one cycle of gait.
Figure 5:
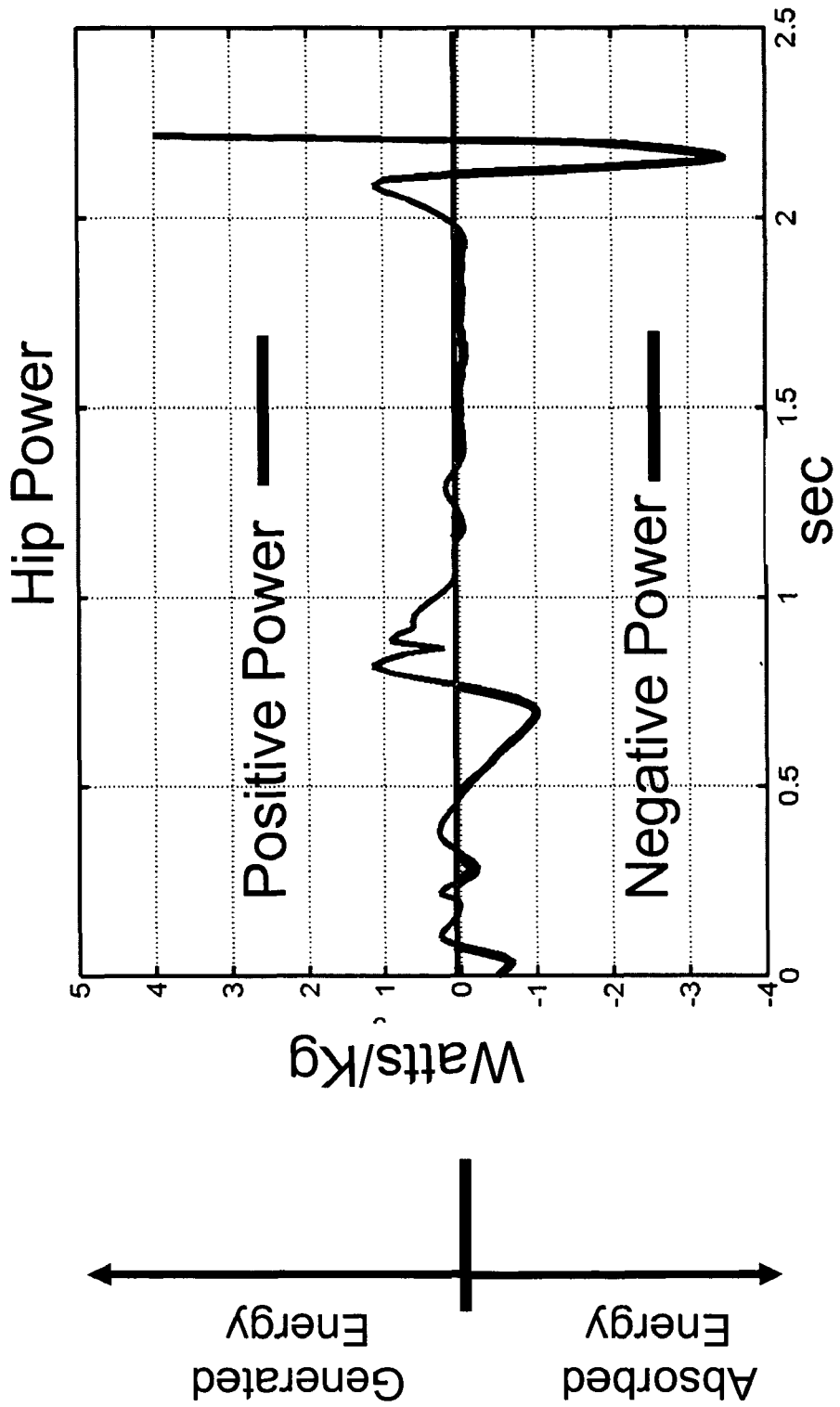
FIG. 5 is a timing diagram of hip joint power generated or absorbed during one cycle of gait.

FIG. 3 is a timing diagram of ankle joint power generated or absorbed during one cycle of gait. FIG. 4 is a timing diagram of knee joint power generated or absorbed during one cycle of gait. FIG. 5 is a timing diagram of hip joint power generated or absorbed during one cycle of gait.

A kinematics and inverse dynamics procedure, as described in U.S. Patent Application Publication US2005/0209535, filed as U.S. patent application Ser. No. 11/038,692, the contents of which are incorporated herein in their entirety, may be used to calculate, respectively, the angular velocity W and joint moments N at the ankle, knee, and hip. The associated joint powers can be calculated from Equation 1. The results are illustrated in FIGS. 3-5, which clearly illustrate that in human gait, the muscles generate and absorb energy during the entire gait cycle. Each period of energy generation and absorption can be very short (a fraction of a second); therefore, control with large bandwidths are essential by the muscle actuators. Consider, for example, the ankle power plot. At heel strike (which occurs at t=0.25 sec), the ankle joint power absorbs energy to decelerate the limb for about 0.5 seconds. During this phase, the muscle actuators at the ankle are doing negative work. The ankle is doing negative work approximately 50% of the time.

3 Inverted Pendulum Model

Figure 6:
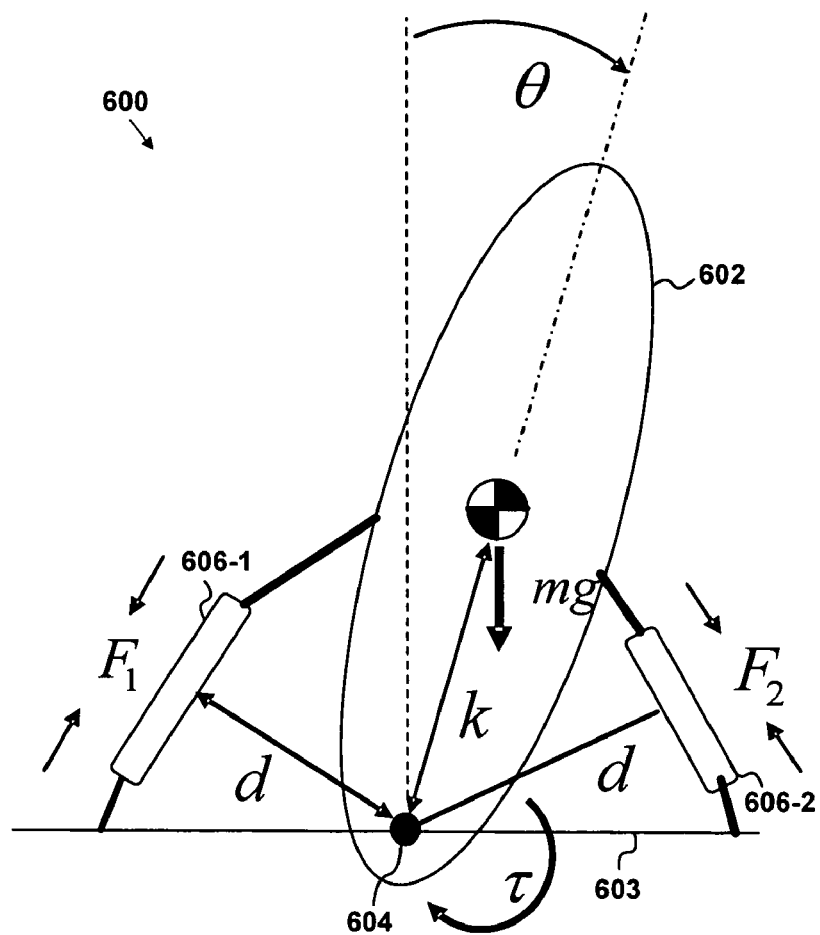
FIG. 6 is a block diagram of a robot that includes an inverted pendulum controlled by a pair of actuators according to the present invention.

FIG. 6 is a diagram illustrating a regenerative actuation and motion controlled system 600 including a simple planar inverted pendulum according to one embodiment of the present invention. A more complex multi-link system, such as the system of FIG. 2, can be viewed as a series of coupled inverted pendulums stacked on top of each other. See, for example, B. Dariush and K. Fujimura, "Fuzzy logic based control model of human postural dynamics", *SAE Conference on Digital Human Modeling for Design and Engineering*, Detroit, Mich. (2000), the contents of which are incorporated herein in their entirety. (See also U.S. Pat. No. 6,633,783, the contents of which are incorporated herein in their entirety.).

The regenerative actuation and motion controlled system 600 comprises a pendulum 602 that is constrained on a base 603 at a pivot point 604 and further comprises actuators 606-1 and 606-2 that generate respective forces $F_1$ and $F_2$ which rotate the pendulum 602 clockwise or counterclockwise, respectively. Suppose the forces $F_1$ and $F_2$ correspond to two separate actuator forces that are actively or passively generated. In one embodiment, a single actuator 606 generates the forces $F_1$ and $F_2$. For simplicity, and without loss of generality, assume the line of action of the forces $F_1$ and $F_2$ is along the circumference of a circle centered at the joint pivot 604 and of radius d, which represents the moment arm of the two forces. In one embodiment, the actuators 606 comprise cable and pulley systems. In humans, the analogy can be made to the control of a sagittal arm by a flexor/extensor muscle pair. See, for example, J. A. Dinneen and H. Hemami, "Stability and movement of a one-link neuro-musculo-skeletal sagittal arm", *IEEE Transactions on Biomedical Engineering*, 40(6): 541-548 (1993), the contents of which are incorporated herein in their entirety. Analogous to human muscles that produce a force under contraction of muscle fibers, in one embodiment, the actuators 606 produce a positive force under compression.

The physical parameters of the system 600 are the mass m of the pendulum 602, considered to be concentrated at a distance k from the axis (pivot 604) of the joint, and the moment of inertia I. The angle θ is measured from the vertical and is positive in the clockwise direction.

The effective length and incremental length of the actuators 606-1 and 606-2 that generate the respective forces $F_1$ and $F_2$ as a function of θ are given by Equations (2) and (3):

$$L = L_o + \frac{\partial L^T}{\partial \theta}(\theta - \theta_o) \quad (2)$$

$$dL = \frac{\partial L^T}{\partial \Theta} d\theta \quad (3)$$

where $L = [L_1 \ L_2]^T$ correspond to the vector form of lengths in the actuators 606-1 and 606-2, respectively, $L_o$ is the 2×1 vector corresponding to the initial length of the actuators 606, and $\theta_o$ is angle at the initial length. The term $\partial L^T/\partial \Theta$ represents the moment arm matrix and is given by Equation (4):

$$\frac{\partial L^T}{\partial \Theta} = [d \ -d] \quad (4)$$

The relationship between the joint torque and the actuator forces is given by Equation (5):

$$\tau = -\frac{\partial L^T}{\partial \Theta} F = d(F_2 - F_1) \quad (5)$$

where $$F = [F_1 \quad F_2]^T \quad (6)$$

Note the convention is used that positive torque is in the clockwise direction. The dynamic equations of motion for this system are described by:

$$I\ddot{\theta} - mkg \sin(\theta) = \tau \quad (7)$$

where g is the gravitational acceleration constant. A model based method to control the inverted pendulum 602 to track a desired trajectory $\theta_d$ is given by, $$\tau = \ddot{\theta}^* - mkg \sin(\theta) \quad (8)$$

where $\ddot{\theta}^*$ is given by, $$\ddot{\theta}^* = \ddot{\theta}_d + K_d(\dot{\theta}_d - \dot{\theta}) + K_p(\theta_d - \theta) \quad (9)$$

The terms $K_p$ and $K_d$ are positive definite position and derivative feedback gains, respectively.

In an alternative embodiment to the model based control approach, the motion of the pendulum 602 can be controlled using one of many different control laws, such as a proportional-integral-derivative (PID) controller given by Equation (10):

$$\tau = K_p(\theta_d - \theta) + K_I \int(\theta_d - \theta)dt + K_d(\dot{\theta}_d - \dot{\theta}) \quad (10)$$

where $K_I$ is the integral feedback gain. The tracking performance of the control law in Equation 10 may be inferior to that of Equation 8; however, Equation 8 is robust to modeling errors and parameter uncertainties.

The control laws in Equations 8 and 10 compute the actuator torque for executing a desired motion profile. The actuator 606 most widely used in robotic applications is the permanent magnet DC motor. Such motors are driven by a controllable voltage or current source. Most motor manufacturers allow the user to indirectly command a desired torque by applying a voltage that is proportional to the armature current. Because motor torque is proportional to armature current, the torque can be directly and accurately controlled.

Figure 8:
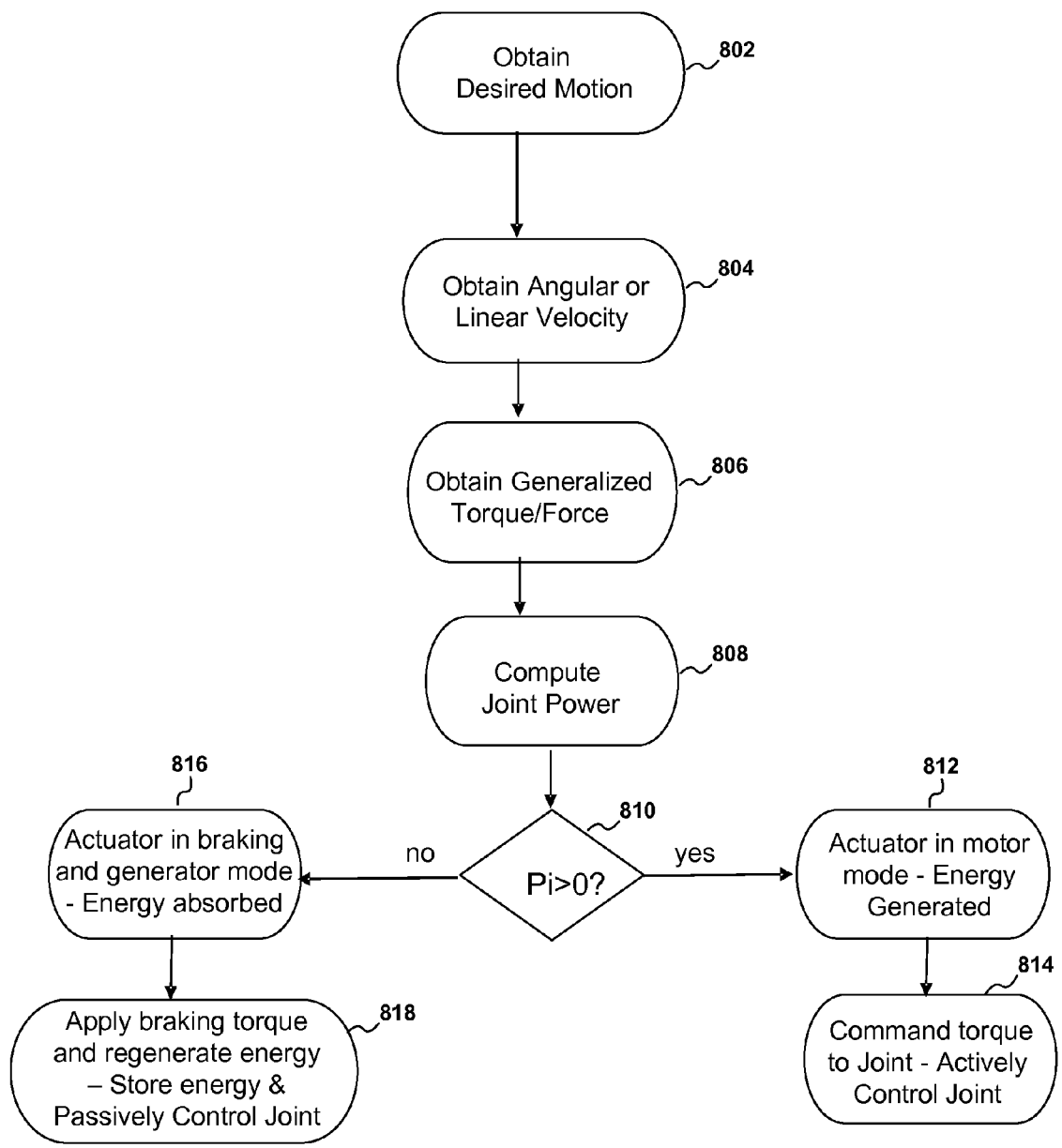
FIG. 8 is a flowchart illustrating one embodiment of a methodology for controlling power to and from the robot of FIG. 1 according to the present invention.

FIG. 8 is a flowchart illustrating one embodiment of a methodology for controlling power to and from the robot 104 of FIG. 1 or the actuators 606 of FIG. 6 according to the present invention.

The controller 102 distributes torque to the linear actuators 606 to produce forces $F_1$ and $F_2$ while satisfying the torque relation given by Equation 5 and by applying the appropriate control signals to the actuators 606. The controller 102 distributes torque using a policy that depends on the direction of the instantaneous joint power. The controller 102 passively controls the joint when the system is absorbing energy and actively controls the joint when the system is generating energy. This principle can be applied to any joint by first computing the joint power and then determining the mode of the actuator as a generator or a motor.

The controller 102 obtains 802 or determines the desired motion of the joint, and determines 804 (from sensors or by prediction) the angular or linear velocity at the joint. The controller 102 determines 806 a generalized torque or force to cause the joint to move in accordance with the desired motion, and computes 808 the power of the joint. If the computed power is positive 810, the controller 102 provides control signals to cause the actuators 406 to generate 512 the corresponding energy for rotating the joint, and actively controls 814 the joint. On the other hand, the joint power is negative 810, the joint absorbs 816 energy, and the controller 102 commands the actuators to store 818 energy and passively controls the joint.

The control of the actuator as shown in FIG. 8 is next described for a rotational joint.

For a rotational joint, the quantities used to determine the power P generated by an actuator is the product of net joint torque τ, and the joint angular velocity, $\omega = \dot{\theta}$, as described in Equation (11):

$$P = \tau \omega \quad (11)$$

Based on the direction of the instantaneous power flow, the forces $F_1$ and $F_2$ have an active component which use supply power and a passive component which stores energy and later releases the stored energy.

If the instantaneous power is negative 810 (P<0), the system can be controlled by dissipating 818 energy passively. Under this scenario, suppose the actuators 606 store the dissipated energy by using passive forces $F_{1p}$ and $F_{2p}$. This may be achieved with an actuator 606 with spring-like properties according to Hooke's law, $$F_{1p(store)} = k_{s1} \delta t_1 \quad (12)$$

$$F_{2p(store)} = k_{s2} \delta t_2 \quad (13)$$

where $k_{s1}$ and $k_{s2}$ are tunable spring coefficient and $\delta t_1$ and $\delta l_2$ represents the displacement of the spring. Since this system is redundantly actuated (2 actuators control 1 joint), the distribution of stored energy in the two passive actuators is not unique. The actuator mechanism provides the passive forces in each spring that does not oppose the direction of the calculated torque to execute the desired motion. In other words, the stored energy should be a byproduct of resistive torques, which are used to dissipate energy with the same magnitude and direction of the control torque. Controlling the magnitude of the stored force (and therefore joint torque) may be achieved by using an actuator with an adjustable spring constant. An example of a spring actuator with adjustable stiffness was developed by Hurst et al. See, for example, J. W. Hurst, J. E. Chestnut, and A. A. Rizzi, "An actuator with mechanically adjustable series compliance", *Carnegie Mellon University Technical Report: CMU-RI-TR*-04-24, Pittsburgh, Pa. (2004), the contents of which are incorporated herein in their entirety. See also, for example, Hurst et al. "An actuator with physically variable stiffness for highly dynamic legged locomotion" noted above. Alternatively, several springs can be combined in parallel and recruited at different times in order to control the force. The stored energy is released when the system goes into energy generation phase 812.

If the instantaneous power is positive 810 (P>0), the system can be controlled by delivering 814 active power by either forces $F_1$ or $F_2$, depending on the direction of the torque. Let $F_{1a}$ and $F_{2a}$ be the active component of the forces generated by the two actuators 606. The joint torque can be expressed as, $$\tau = d(F_{1a} + F_{p(release)}) \text{ if } \tau \leq 0 \quad (14)$$

$$\tau = d(F_{2a} + F_{p(release)}) \text{ if } \tau \geq 0 \quad (15)$$

where $F_{p\,(release)}$ is the force that is released from one or both of the passive springs, depending on the current state. The released spring force of each actuator 606 is in the same direction as the active force component. The active component of actuator force $F_1$ is computed as follows, $$F_{1a} = \begin{cases} -\tau/d - F_{p(release)} & \text{if } \tau \leq 0 \\ 0 & \text{otherwise} \end{cases} \quad (16)$$

where $\tau$ is obtained by the control law in Equation 8 or Equation 10. The active component of actuator force $F_2$ is computed by, $$F_{2a} = \begin{cases} -\tau/d - F_{p(release)} & \text{if } \tau \leq 0 \\ 0 & \text{otherwise} \end{cases} \quad (17)$$

Another embodiment of the present invention provides energy regeneration, which uses actuators 606 as motors when energy needs to be generated by the system 812 and uses them as generators when energy needs to be absorbed/regenerated by the system 816. According to a further embodiment, absorbed/regenerated energy can be stored 818 and used to provide active actuation 814 when the actuators are used as motors.

4 Multi-Link Systems

The equations of motion of an n degree of freedom, unconstrained, multi-link rigid body system, such as shown in FIG. 2, can be described by the following differential equation, $$M(q)\ddot{q} + h(q,\dot{q}) = T \quad (18)$$

where vector q is an n×1 vector of generalized coordinates that describe the configuration of the system, M is an n×n joint space inertia matrix, and h is an n×1 vector describing the effects of the coriolis, centrifugal, gravitational, and friction forces. The vector T is n×1 and represents the generalized forces (or torques). The multi-link version of the tracking controller 102 in Equation 8 is given by, $$T = M(q)\ddot{q}^* + h(q,\dot{q}) \quad (19)$$

where $$\ddot{q}^* = \ddot{q}_d + K_d(\dot{q}_d - \dot{q}) + K_p(q_d - q) \quad (21)$$

where $q_d$ is an n×1 vector of the desired generalized coordinates, and the feedback gains $K_d$ and $K_p$ are n×n positive definite, diagonal matrices. Without loss of generality, the system is assumed to have i=1 . . . n rotational joints and each joint is actuated. The control law for the $i_{th}$ actuator is denoted by $T_i$.

The PID control law in Equation 10 is an independent joint controller. Therefore, with modification of the variable names, the multi-link version of the controller is identical to the single link control presented in Equation 10.

$$T_i = K_{pi}(q_{di} - q_i) + K_{Ii}\int(q_{di} - q_i)dt + K_{di}(\dot{q}_{di} - \dot{q}_i) \quad (22)$$

where the feedback gains are all scalars, as in Equation 10. If $T_i$ actuates the $i_{th}$ joint in this system, and $w_i$ is the associated angular velocity of the $i_{th}$ joint, then the power to actuate the joint is given by, $$P_i = T_i w_i \quad (23)$$

The initial step in the control process is to generate the desired trajectory. There are several methods for computing the trajectory in multi-dimensional space which describes the desired motion of a robot. A trajectory described in joint space can be specified by the vector q, and determines the motion of each degree of freedom, its velocity, and its acceleration. Alternatively, a trajectory can be described in task space by a set of Cartesian variables which are related to joint varibles q. Depending on the application, the desired motion of the system can be planned off-line, or generated at run-time using a variety of trajectory generation schemes. It is sometimes sufficient that the user specify only the desired goal position and orientation of a point on the robot, and leave the system to decide on the exact shape of the path to get there, the duration, the velocity profile, and other details.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for controlling a motion controlled system, the method comprising:
   generating, using the controller, a trajectory specifying a desired motion of the motion controlled system to a desired position for the motion controlled system in joint space or in task space;
   computing power to be applied to the motion controlled system to produce a motion moving the motion controlled system to a first position along the trajectory;
   generating, using the controller, a first control signal to supply energy to the motion controlled system to move the motion controlled system along the trajectory when the computed power is above a first predetermined level;
   generating, using the controller, a second control signal to draw energy from the motion controlled system as moves the motion controlled system along the trajectory when the computed power is below a second predetermined level; and
   generating, using the controller, a third control signal to store the regenerated energy.

2. The method of claim 1 wherein the motion controlled system is a robotic joint.

3. The method of claim 1 further comprising:
   generating, using the controller, a fourth control signal to supply the stored energy to the motion controlled system when the computed power is above the first predetermined level,
   wherein the generating, using the controller, the first control signal includes generating the first control signal to supply stored energy to the motion controlled system.

4. The method of claim 1 further comprising:
   measuring angular velocity of the motion controlled system,
   wherein the computing power to be supplied to the motion controlled system includes:
      determining the torque to be applied to the motion controlled system in response to the measured angular velocity, and
      computing the power to be supplied to the motion controlled system based on the computed torque.

5. The method of claim 4 wherein the determining the torque includes computing the torque to be applied to the motion controlled system in response to the measured angular velocity.

6. The method of claim 4 wherein determining the torque includes measuring the torque to be applied to the motion controlled system in response to the measured angular velocity.

7. The method of claim 1 further comprising:
   detecting motion of the motion controlled system, wherein computing power to be applied to the motion controlled system further includes computing power to be applied to the motion controlled system based on the detected motion and the motion moving the motion controlled system to a first position along the trajectory.

8. The method of claim 1 wherein the motion controlled system includes an actuator that brakes the motion controlled system.

9. The method of claim 8 wherein the actuator includes a regeneration mode.

10. The method of claim 1 wherein the motion controlled system includes an actuator system comprising first and second actuators, the first and second actuators cause the motion controlled system to move in first and second directions, respectively, the first actuator using positive power in the first direction and storing or releasing energy in the second direction, the second actuator using positive power in the second direction and storing or releasing energy in the first direction.

11. A system comprising:
a motion controlled system for controlling motion of a structure in response to first, second and third control signals;
a controller for generating a trajectory specifying a desired motion of the motion controlled system to a desired position for the motion controlled system in joint space or in task space, computing power to be applied to the motion controlled system to generate a motion moving the motion controlled system to a first position along the trajectory, for generating the first control signal to supply energy to move the motion controlled system along the trajectory when the computed power is above a first predetermined level, for generating the second control signal to draw energy from the motion controlled system as the motion controlled system moves along the trajectory when the computed power is below a second predetermined level; and for generation the third control signal to store the energy drawn from the motion controlled system.

12. The system of claim 11 wherein the motion controlled system includes a robotic joint.

13. The system of claim 11 wherein the controller further generates the fourth control signal to supply the stored energy to the motion controlled system when the computed power is above the first predetermined level, and generating the first control signal includes generating the first control signal to supply stored energy to the motion controlled system.

14. The system of claim 11 wherein the motion controlled system measures angular velocity of the structure,
wherein the controller computes power to be applied to the motion controlled system by determining the torque to be applied to the motion controlled system in response to the measured angular velocity, and computing the power to be applied to the motion controlled system based on the computed torque.

15. The system of claim 11 wherein the motion controlled system further detects motion of the structure,
wherein the controller computes power to be applied to the motion controlled system based on the detected motion and the motion moving the motion controlled system to a first position along the trajectory.

16. The system of claim 11 wherein the motion controlled system includes an actuator that brakes the motion controlled system.

17. The system of claim 16 wherein the actuator includes a regeneration mode.

18. The system of claim 11 wherein the motion controlled system includes an actuator system comprising first and second actuators, the first and second actuators cause the motion controlled system to move in first and second directions, respectively, the first actuator using positive power in the first direction and storing or releasing energy in the second direction, the second actuator using positive power in the second direction and storing or releasing energy in the first direction.

19. The system of claim 11 wherein the motion controlled system includes a movable member, and includes an actuator system for moving the member in first and second directions, the actuator system comprises first and second actuators, the first and second actuators provide a positive force in response to a compression thereof in response to movement in the first and second directions, respectively, of the movable member, and provide a negative force in response to an expansion thereof in response to movement in the second and first directions, respectively, of the movable member.

20. The system of claim 11 wherein the motion controlled system includes a base, a movable member coupled to the base and rotatable about an axis, and includes an actuator system for rotating the moveable member in first and second directions about the axis, the actuator system comprises first and second actuators, each first and second actuators including a first end coupled to the base and including a second end coupled to the movable member, the second ends of the first and second actuators being coupled to opposite sides of the movable member.

21. The system of claim 20 wherein, the first and second actuators provide a positive force in response to a compression thereof in response to movement in the first and second directions, respectively, of the movable member, and provide a negative force in response to an expansion thereof in response to movement in the second and first directions, respectively, of the movable member.

* * * * *

UNITED STATES PATENT AND TRADEMARK OFFICE
CERTIFICATE OF CORRECTION

| | | |
|---|---|---|
| PATENT NO. | : 8,082,062 B2 | |
| APPLICATION NO. | : 11/450248 | |
| DATED | : December 20, 2011 | |
| INVENTOR(S) | : Behzad Dariush | |

It is certified that error appears in the above-identified patent and that said Letters Patent is hereby corrected as shown below:

Claim 1, column 10, lines 31-35, replace the text as follows:

--generating, using the controller, a second control signal to draw energy from brake the motion controlled system and to regenerate energy from the motion controlled system as moves the motion controlled system moves along the trajectory when the computed--

Claim 11, column 11, lines 33-38, replace the text as follows:

--to draw energy from brake the motion controlled system and to regenerate energy from the motion controlled system as the motion controlled system moves along the trajectory when the computed power is below a second predetermined level; and for generation generating the third control signal to store the energy drawn from the motion controlled system regenerated energy.--

Signed and Sealed this
Fourteenth Day of August, 2012

David J. Kappos
*Director of the United States Patent and Trademark Office*